Sept. 25, 1951    A. KINDLING    2,569,005
MACHINE TOOL FIXTURE
Filed June 7, 1949    3 Sheets-Sheet 1
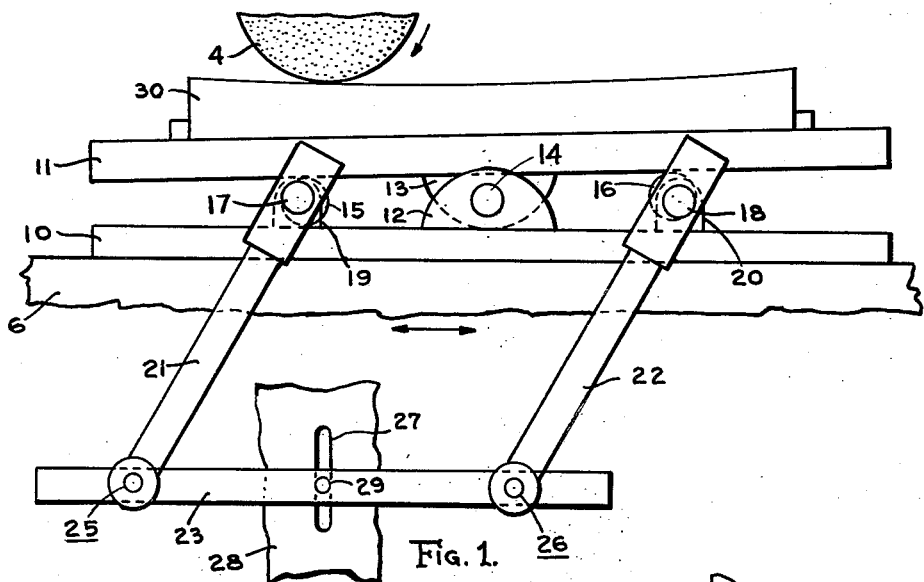
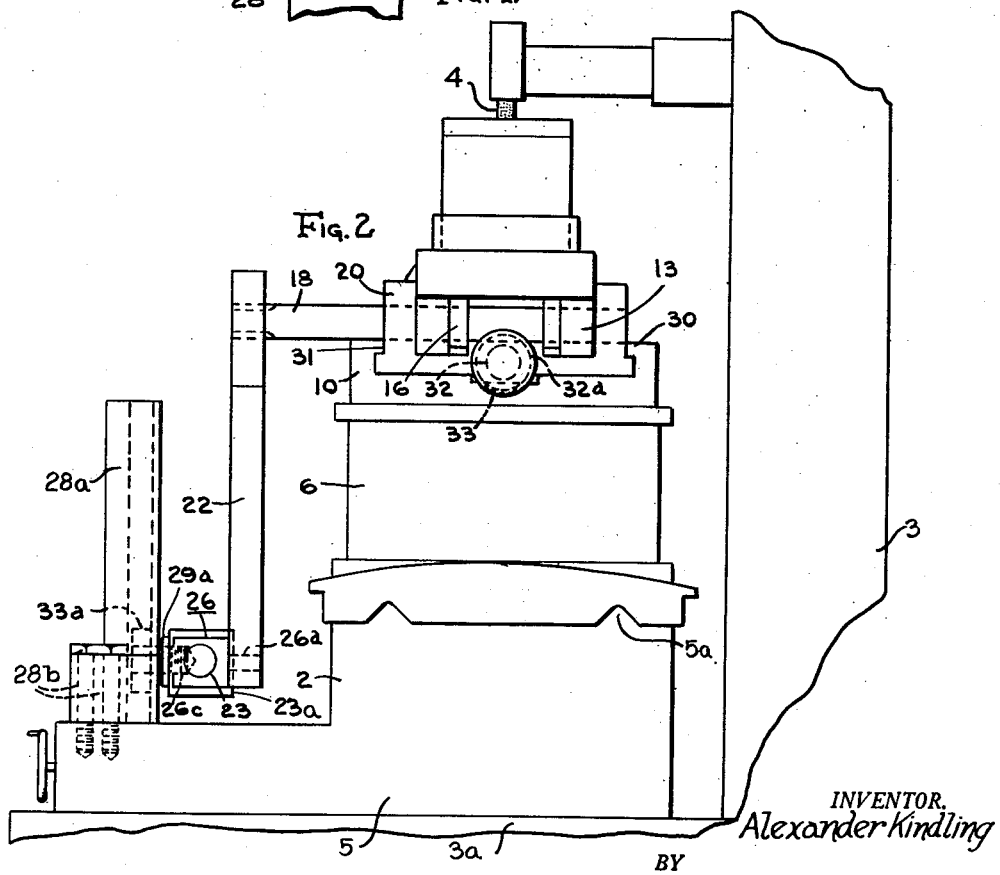
INVENTOR.
Alexander Kindling
BY
E. F. Oberheim
Agt.

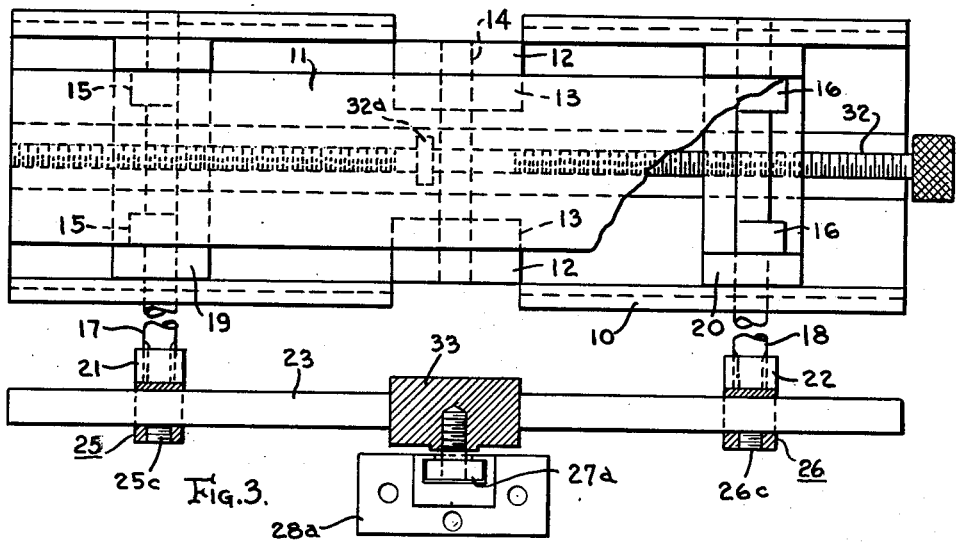
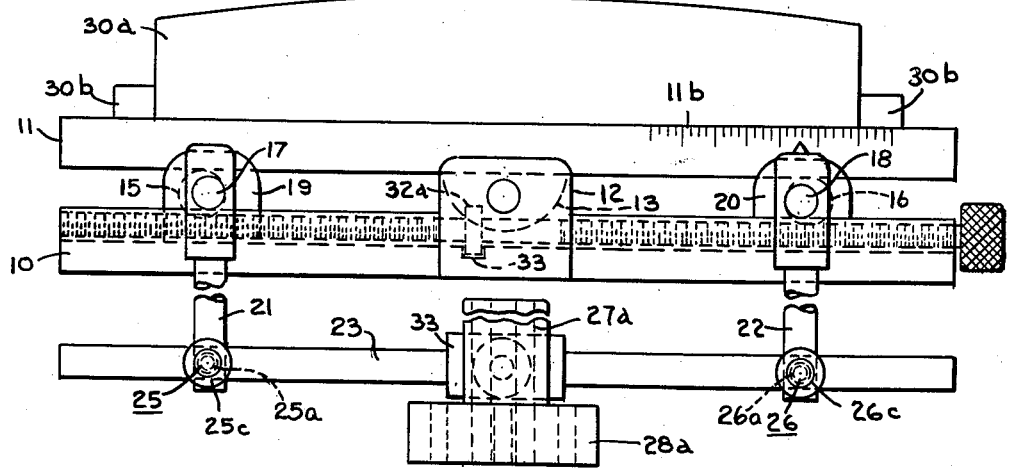

Patented Sept. 25, 1951

2,569,005

UNITED STATES PATENT OFFICE 2,569,005

MACHINE-TOOL FIXTURE

Alexander Kindling, East Pittsburgh, Pa.

Application June 7, 1949, Serial No. 97,559

5 Claims. (Cl. 51—94)

This invention relates generally to machine tools and more in particular to fixtures usable with machine tools for effecting predetermined relative movement between the relatively movable machine tool parts.

In machine tool applications, for instance, grinders, shapers and planers, it is frequently necessary to shape parts to specified radii. In applications to grinders the arcuate shaping of such parts usually involves the supporting of either the workpiece or the grinding wheel on a radius bar whose length corresponds to the specified radius for the arc and thereafter affecting relative movement between the grinding wheel and workpiece to form the desired arcuate surface.

While this arrangement has afforded an acceptable solution to the problem of radius grinding, the application of this principle to the shaping of surfaces to large radii results in an equipment of cumbersome proportions requiring a wide range of attachments to adapt a machine to a diversity of job requirements.

It is therefore one object of this invention to provide a fixture for machine tools for producing non-linear relative movement between the relatively movable machine tool components, which is simple with respect to operational requirements and positive in operation.

Another object of this invention is to provide a fiixture of the class referred to which is compact.

Yet another and more specific object of this invention is to provide a fixture for attachment to a machine tool having relatively movable work supporting and cutting tool components in which relative movement between the workpiece and the cutting tool, according to a predetermined pattern is affected as a function of the relative movement of the work supporting and cutting tool members.

A specific object of this invention is to provide an apparatus for attachment to the stationary and movable members of a machine tool which describes an arc of a circle, with respect to a given point on said machine upon relative movement of the stationary and movable members.

In connection with the preceding object it is also an object of this invention to provide a radius grinding fixture which is conveniently adjustable over a wide range of radii.

The foregoing statements are merely illustrative of the various aims and objects of this invention. Other objects and advantages will become apparent upon a study of the following descriptive disclosure when considered in conjunction with the accompanying drawings, in which:

Fig. 1 is a schematic illustration of an apparatus for generating an arc of a circle, embodying the principles of this invention.

Fig. 2 is an end view of a practical embodiment of the radius grinding fixture of this invention showing its attachment to a conventional grinder, the grinder being fragmentarily illustrated.

Fig. 3 is a top plan view of the radius grinding fixture of Fig. 2, removed from the grinder.

Fig. 4 is a front elevational view of the radius grinding fixture, and

Figure 5:
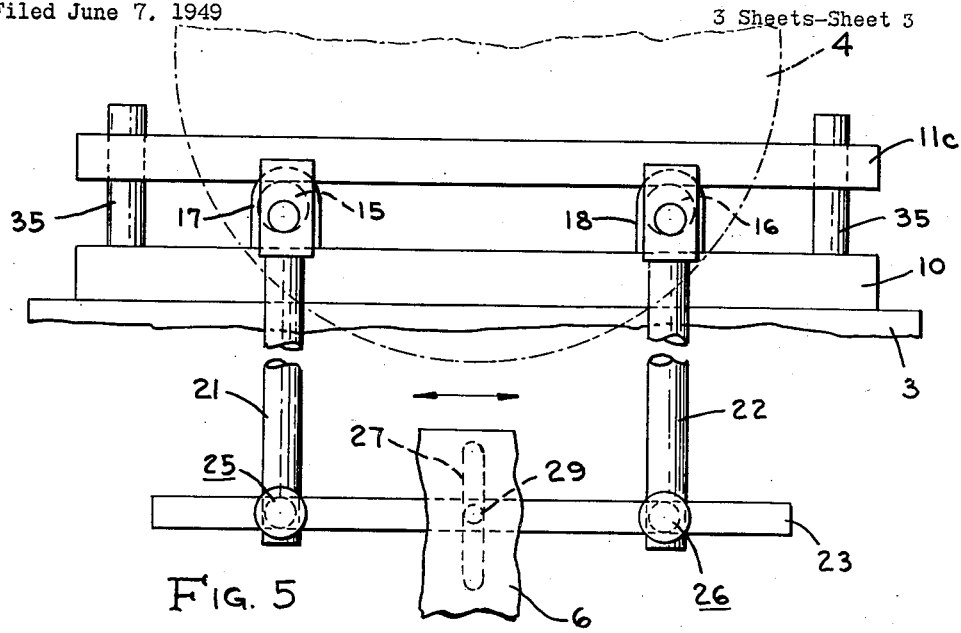
Figs. 5 and 6 illustrate modifications of the invention embodied in Figs. 1 through 4.

The application of this invention to a conventional grinder is illustrated in the drawing. Such a grinder (see Fig. 2) includes a base, supporting a platen assembly generally designated 2 and a pedestal 3 (fragmentarily illustrated) which supports the grinding wheel 4 for rotation above the platen assembly. The wheel is driven by suitable motor means not shown. The platen assembly comprises a lower platen 5 mounted on guides (not shown) on base 3a for movement transversely of the plane of the grinding wheel and an upper platen 6 mounted in guides 5a on the lower platen 5 and which is movable in the plane of the grinding wheel at right angles to the movement of the lower platen. Movement in the two mentioned directions may be automatic or manual.

The principles of this invention will be readily appreciated from an inspection of Fig. 1 in which, in the interests of simplicity, the grinder components are illustrated fragmentarily.

The fixture includes a base 10, which is magnetically or otherwise suitably secured to the upper platen 6 to move therewith in the direction indicated by the arrow, beneath the grinding wheel 4. A tilt plate 11 is pivotally mounted upon the base 10 by means of brackets 12 and 13, respectively secured to the base 10 and tilt plate 11, a pin 14 functioning as the pivot. The tilt plate 11 is tilted about its pivot pin 14 by means of circular cams 15 and 16 which are eccentrically mounted upon shafts 17 and 18, respectively, which shafts in turn are journaled in brackets 19 and 20, respectively, on opposite sides of the pivot pin 14.

Cam shafts 17 and 18 are actuated by relative movement between the upper platen 6 and the grinding wheel 4, which with the type of grinder illustrated may be accomplished conveniently by employing a parallelogram linkage including a pair of rods 21 and 22, respectively, secured to the cam shafts 17 and 18 and pivotally joined at their lower ends by means of a connecting rod 23, the points of pivoting or pivot assemblies being designated, respectively 25 and 26. The distance along the connecting rod 23 between the centers of the two points of pivoting exactly corresponds to the distance between centers of the cam shafts 17 and 18, whereby the four centers define the four corners of the parallelogram linkage. Thus it will be appreciated that by movement of the upper platen 6 from left to right as viewed in Fig. 1, while the connecting rod is restrained against such movement, the mechanical movement afforded by the parallelogram linkage rotates cam shafts 17 and 18 in the same direction in the same amount as a function of the magnitude of the linear displacement of the upper platen 6 with respect to the connecting rod 23. Any convenient mechanical means may be employed to restrain the connecting rod 23. A suitable means is schematically illustrated in Fig. 1 wherein a vertical slot 27 is formed in a stationary part 28 and a pin 29 secured in connecting rod 23 projects into the slot. This provides freedom of movement of bar 23 vertically while restraining lateral movement with respect to the slot, compensating foreshortening of rods 21 and 22 when angularly displaced.

Since the cams are rotated in the same direction by actuation of the parallelogram linkage, cams 15 and 16 are disposed in 180 degree relation so that clockwise rotation of cam 15, for example, as viewed in Fig. 1, results in lowering of the left side of tilt plate 11 while clockwise rotation of cam 16 results in elevating of the right side of tilt plate 11 in the same amount. Movement of the upper platen 6 from right to left as viewed of course, results in tilting of tilt plate 11 in the reverse direction about its axis.

It will therefore be appreciated that movement of the upper platen 6 back and forth beneath the grinding wheel 4 will describe a curve with respect to the point of tangency of the grinding wheel and the workpiece 30. By the geometry of the system, such a curve will be an arc of a circle, the radius of which is determined by the spacing of the cams, the eccentricity of the cams, and the length of the rods 21 and 22. Variation in anyone of the mentioned parameters results in variation in the radius of the arc in a corresponding degree.

With the arrangement illustrated in Fig. 1, a concave surface is formed in the workpiece 30. A convex surface may be generated by simply rotating each cam 180 degrees from the position illustrated in Fig. 1. Such a position of the cams is illustrated in Fig. 4 to be hereinafter described.

Figs. 2, 3 and 4 illustrate a practical embodiment of this invention which is based upon the elementary features considered with regard to Fig. 1, and which in addition provides means for adjusting the mechanism to afford variations in the radius of curvature of the surface to be ground.

The base 10 of the fixture as best seen in Fig. 2 is essentially of the shape of a channel in which the upper extremities 31 of the channel sides are directed inwardly. The base of the channel is also grooved longitudinally to provide a guide for the brackets 19 and 20.

Brackets 19 and 20 are of suitable configuration as illustrated by bracket 20 in Fig. 2, to slidably fit within the grooves of base 10 in which position movement laterally and vertically of the base is prevented, but sliding movement longitudinally thereof is permitted. The brackets 19 and 20 are adjustably secured in longitudinally spaced relation by means of the right and left-hand threaded screw 32 which threads through the base of each of the brackets and is rotatably fixed longitudinally of the base by means of a collar 32a, which engages a milled slot 33 in the bottom of the tilt plate. Screw 32 is actuated by means of a knurled operating member 34.

The pivot assemblies 25 and 26 which pivotally connect the connecting rod 23 to the respective rods 21 and 22 are machined blocks drilled in one face to receive pins 25a and 26a to pivotally secure the rods 21 and 22 thereto and are each additionally provided with a hole respectively designated 25b and 26b, at right angles to those receiving the pivot pins, through which the connecting rod 23 is slidably fitted. Set screws 25c and 26c threading into the front face of the respective blocks lock the blocks to the connecting rod.

Stationary part 28 in Fig. 1 is of the form of guide 28a appearing in Figs. 2, 3 and 4. This guide is disposed with its slot 27a in a vertical position and its flanged base seats upon the lower platen 5 to which it is attached by bolts 28b shown only in Fig. 2. In Figs 2, 3 and 4, the central portion of connecting rod 23 is equipped with a block 23a which may be an integral part of the connecting rod. This block threadedly receives a threaded stud 29a having a ball bearing assembly 33a pressed over its projecting extremity. The ball bearing assembly fits within the slot 27a allowing movement vertically only of guide 28a.

Brackets 12 are secured to base 10 centrally thereof in any suitable manner and tilt plate 11, by means of its brackets 13 and pivot pin 14, is pivotally supported in brackets 12 as previously described.

As shown in Fig. 4, the configuration of the machined surface of workpiece 30a is convex which is accomplished by positioning the points of maximum eccentricity of the cams outwardly in the assembly as shown. Thus clockwise rotation of the cams results in clockwise tilting of the tilt plate. This results from movement of the base 10 from left to right in Fig. 4, the principle here being identical with that of Fig. 1.

In operation the workpiece 30a is positioned on the tilt plate 11 and secured thereto by clamping means represented schematically by blocks 30b or by other suitable means. The particular radius to be ground is then ascertained and the fixture adjusted to provide the required radius by adjustment of screw 32 to properly position the brackets. As an aid in expediting this setting, the tilt plate is provided with suitable indicia 11b which may be conveniently calibrated in terms of radii for the known parameters of the mechanism. In making this adjustment, the set screws 25c and 26c are loosened so that with all parts centered with the vertical centerline of the grinding wheel, the rods 21 and 22 may be vertically disposed to embrace a span of connecting rod 23 corresponding to the centerline spacing of the cams. Upon setting of the correct radius, the connecting rod is secured by tightening of the set screws. Thereafter the function of the device is at automatic consequence of movement of the upper platen 6 with respect to lower platen 5.

Although this fixture has been applied in a grinder for moving the workpiece in correlation with the relative movement of the upper platen with respect to the lower platen, it is equally feasible to apply the fixture to displace the grinding wheel with the workpiece stationary. The fixture is further adaptable to planers and other similar machine tools. Additionally the adjustability features may be achieved by changing the cams or by varying the length of rods 21 and 22 as required.

Figure 6:
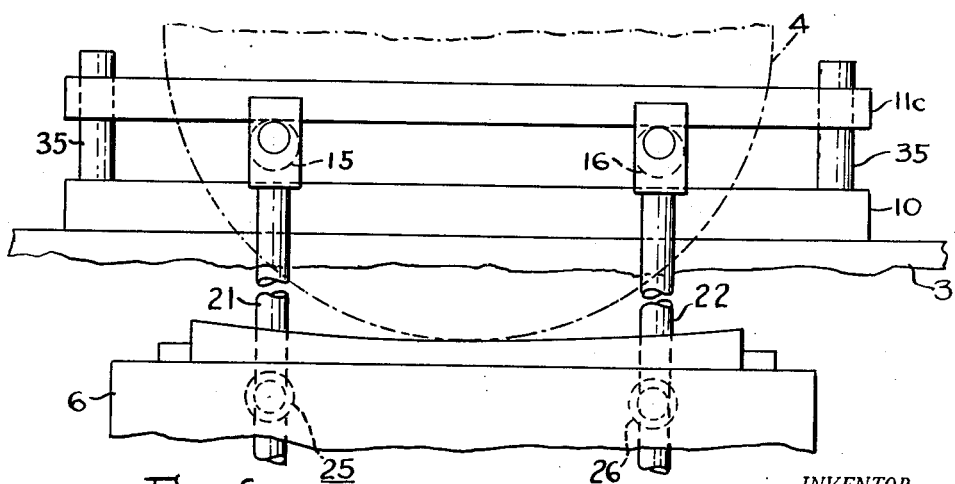

The application of this invention in moving the grinding wheel vertically with respect to the workpiece is shown in Figs. 5 and 6, Fig. 5 illustrating the position of the cams for finishing a convex surface and Fig. 6 illustrating cam positions for obtaining concave surfaces.

In Fig. 5 the base 10 of the fixture is supported upon the pedestal 3 of the grinder (only fragmentarily shown). Instead of the tilt plate illustrated in the preceding figures, a plate 11c is provided. This plate is mounted in suitable guide members 35 which may be positioned at the four corners of the base 10 to slidably engage the plate 11c. As illustrated the plate 11c is supported entirely upon the circular eccentric cams 15 and 16, which as before are mounted upon cam shafts 17 and 18 journalled in brackets 19 and 20 on base 10. In this embodiment, however, the cams are disposed in corresponding positions beneath the plate 11c and for a convex surface, with the mechanism centered, the maximum eccentricity of the cams is up. The parallelogram linkage as before includes rods 21, 22 and connecting rod 23 which in this instance may be moved horizontally by the upper platen 6 shown fragmentarily, provision being made in the pivot assemblies 25 and 26 for sliding movement of connecting rod towards and away from the rods 21 and 22 following transverse movement of the lower platen 5. Alternatively this movement may be provided in the pin and slot assembly at 29 on the moving platen. The grinding wheel assembly and its drive are mounted on the plate 11c.

Thus it will be appreciated that movement of the platen 6 from left to right as viewed, progressively lowers the grinding wheel 4 towards the platen 6 as a function of the movement of platen 6. Movement in the return direction raises the wheel until the center position is reached and then lowers the wheel. The geometry of the system is such that the two components of motion describe an arc of a circle at the point of tangency of the grinding wheel and the workpiece.

In Fig. 6 the maximum eccentricity in the centered position is down. Thus the grinding wheel is elevated on each side of center as a function of the movement of platen 6, generating a concave surface. Also in Fig. 6 the connecting rod 23 is eliminated and the rods 21 and 22 pivotally connected at 25 and 26 to the platen 6. The points of pivoting of the rods to the platen may be made adjustable longitudinally of the platen to provide for spacing therebetween corresponding to the spacing of the cams.

If surfaces other than arcs of circles are to be machined, for example, a surface of the form of a parabola or of an ellipse, this is conveniently accomplished by substituting cams of suitable configuration for the circular cams. It will also be appreciated that other mechanical means may be substituted for the parallelogram linkage to obtain the desired cam movement.

Thus the foregoing disclosure and the illustrations in the drawings are to be regarded only as illustrative and not interpreted in a limiting sense.

I claim as my invention:

1. A machine tool fixture comprising, in combination, a base, a tilt plate pivotally mounted on said base, a pair of identical cams rotatably mounted on said base on opposite sides of said tilt plate and in engagement with said tilt plate, said cams being eccentrically displaced by 180 degrees, means for simultaneously rotating said cams in the same direction, and mechanical adjusting means connected with said cams for selectively moving said cams simultaneously towards each other and away from each other.

2. A machine tool fixture comprising, in combination, a base, a tilt plate, pivot means pivotally mounting said tilt plate on said base for tilting movement in both directions about said pivot means, a bracket slidably mounted on said base for movement towards and away from said pivot means, a cam shaft rotatably mounted on said bracket, a circular cam eccentrically mounted on said cam shaft in a position continuously engaging said tilt plate, means for rotating said cam shaft through a predetermined angle in both directions, and mechanical actuating means connected with said bracket for moving said bracket towards and away from said pivot means.

3. A machine tool fixture comprising, in combination, a base, a tilt plate, pivot means pivotally mounting said tilt plate on said base for tilting movement in both directions about said pivot means, a cam shaft rotatably mounted on said base, a circular cam eccentrically mounted on said cam shaft in a position continuously engaging said tilt plate, means for rotating said cam shaft through a predetermined angle in both directions, and means for adjusting the spacing of said cam shaft from said pivot means.

4. A machine tool fixture comprising, in combination, a base, a tilt plate pivotally mounted on said base, a pair of brackets, means slidably mounting said brackets, respectively, on opposite sides of said pivot means on said base, a cam shaft rotatably mounted in each bracket, a cam eccentrically mounted on each cam shaft, said cams being displaced by 180°, mechanical means connected with both cam shafts for simultaneously rotating both cams in the same direction, and mechanical adjusting means connected with both of said brackets for selectively moving said brackets simultaneously towards each other and away from each other.

5. Apparatus as recited in claim 4, in which said mechanical adjusting means comprises a screw member having a left-hand thread engaging one bracket and a right-hand thread engaging the other bracket, said base having a slot therein transversely of said screw member, and a collar fixed to said screw member and projecting into said slot.

ALEXANDER KINDLING.

REFERENCES CITED

The following references are of record in the file of this patent:

UNITED STATES PATENTS

| Number | Name | Date |
|---|---|---|
| 236,287 | Williams | Jan. 4, 1881 |
| 1,503,687 | Hunt | Aug. 5, 1924 |
| 1,704,855 | Chase | Mar. 12, 1929 |
| 1,794,271 | Asbridge | Feb. 24, 1931 |
| 1,970,000 | Dunbar et al. | Aug. 14, 1934 |
| 2,047,872 | Helm | July 14, 1936 |

FOREIGN PATENTS

| Number | Country | Date |
|---|---|---|
| 65,003 | Germany | Jan. 14, 1892 |
| 673,260 | Germany | Feb. 24, 1935 |